(12) United States Patent
Jenkins

(10) Patent No.: US 11,195,138 B2
(45) Date of Patent: Dec. 7, 2021

(54) SYSTEM AND METHOD FOR RISK, WASTE, AND OPPORTUNITY EVALUATION, ANALYSIS, AND RECOMMENDATION

(71) Applicant: Jonathan Jenkins, Germantown, MD (US)

(72) Inventor: Jonathan Jenkins, Germantown, MD (US)

(*) Notice: Subject to any disclaimer, the term of this patent is extended or adjusted under 35 U.S.C. 154(b) by 76 days.

(21) Appl. No.: 16/104,000

(22) Filed: Aug. 16, 2018

(65) Prior Publication Data
US 2019/0057333 A1 Feb. 21, 2019

Related U.S. Application Data

(60) Provisional application No. 62/546,458, filed on Aug. 16, 2017.

(51) Int. Cl.
*G06Q 10/06* (2012.01)
*G06N 20/00* (2019.01)

(52) U.S. Cl.
CPC .......... *G06Q 10/067* (2013.01); *G06N 20/00* (2019.01); *G06Q 10/0633* (2013.01); *G06Q 10/0637* (2013.01); *G06Q 10/06393* (2013.01)

(58) Field of Classification Search
CPC .. G06Q 10/00; G06Q 10/107; G06Q 30/0201; G06Q 10/06; G06Q 10/0631; G06Q 10/0639; G06Q 20/40; G06Q 20/4016

USPC ......................................................... 705/348
See application file for complete search history.

(56) References Cited

U.S. PATENT DOCUMENTS

| | | | | |
|---|---|---|---|---|
| 6,502,102 B1* | 12/2002 | Haswell | ............... | G06F 11/3664 |
| 6,701,345 B1* | 3/2004 | Carley | ................... | G06F 16/252 |
| | | | | 709/205 |
| 6,907,546 B1* | 6/2005 | Haswell | ............... | G06F 11/3684 |
| | | | | 714/38.11 |
| 7,023,979 B1* | 4/2006 | Wu | ...................... | H04M 3/5233 |
| | | | | 379/265.11 |
| 7,747,559 B2* | 6/2010 | Leitner | ................... | G06Q 30/02 |
| | | | | 707/770 |
| 2015/0186807 A1* | 7/2015 | Scriffignano | ......... | G06Q 10/063 |
| | | | | 705/7.11 |
| 2015/0363192 A1* | 12/2015 | Sturtevant | ........... | G06F 11/3604 |
| | | | | 717/131 |

\* cited by examiner

*Primary Examiner* — Peter Ludwig
(74) *Attorney, Agent, or Firm* — Christopher Mayle; Bold IP, PLLC

(57) ABSTRACT

An inference engine titled the Waste, Opportunity, and Risk Engine Query Language or (WORE-QL) that links rules to any business objects in a workplace source system. The rules are constructed from small building blocks of business logic (small rule sets) that operate on information contained in various objects. WORE-QL promotes cultural and engineering principles and values for teams to more quickly deliver high quality while generating textual analyses and recommendations for changes associated with a project or roll up of projects with approximate cost, time, resource, and application-based savings.

20 Claims, 4 Drawing Sheets

| Key | Value |
|---|---|
| AssemblyName | WORE |
| TargetFramework# | 4.6 |
| OutputType | Class |
| PlatformTarget | Any |
| DebugYN | 1 |
| TraceYN | 0 |
| Copyright | Copyright © Clearly Agile 2017 |

Figure 3

| Data Element | Comparison | Value | WORE Text |
|---|---|---|---|
| gb.DebugYN | = | True | Remember to turn debugging off prior to production release. |
| gb.Copyright | ~ | @YEAR | Update the copyright notice to reflect the current year. |

Figure 4

SYSTEM AND METHOD FOR RISK, WASTE, AND OPPORTUNITY EVALUATION, ANALYSIS, AND RECOMMENDATION

CROSS-REFERENCE TO RELATED APPLICATIONS

This application claims priority to U.S. Provisional Application 62/546,458 filed on Aug. 16, 2017. The content of the above application is hereby expressly incorporated by reference herein in its entirety.

FIELD OF DISCLOSURE

The overall field of the invention is a computer-implemented system and method for applying a class library of rules to a collection of data and more specifically a multi-level organization of rules to enable evaluation, management, modification, analysis, and recommendations of software development and delivery processes as well as behaviors to identify waste and increase efficiency.

BACKGROUND

Modern businesses typically require a number of projects and operations in order to function profitably. Depending on the specific area of business and type of project, a company may need numerous employees, contractors, facilities, software, tools, support, information processing capabilities, and communications systems to complete a specific task within a project. Software development in particular has many complex processes that are performed from beginning to completion. Development, maintenance, and replacement of software may be done in distinct phases or the software may be updated in incremental steps, where design, construction, and development may occur simultaneously. Workplace environments such as these typically lead to various errors and omissions, as well as excessive waste, processes, and resources, especially when under heavy time constraints. Companies also miss significant opportunities of improvement having tunnel vision for completing the task at hand. Companies have avoided this all too common scenario by hiring more employees to monitor these happenings or contracting with outside consultants. This however is costly, which may be especially damaging for fledgling startup companies. Currently, there are software applications that provide evaluation and analysis of the actual computer language while comparing the computer language to a set of rules but these applications do not extend to the mechanics of the entire workplace where there is usually a significant amount of waste, opportunities for improvement, and risk.

SUMMARY

It is an object of the present description to provide a method of outputting data analysis using an engine comprising, providing an engine that is a centralized system for management of data capable of directly loading input data from a source system into the engine for a user to receive a response by the engine, creating a rules collection database having one or more rules, wherein the one or more rules are a string of conditions to test input data against, the rules collection database is in communication with the engine, setting a predetermined action regarding when a condition of the rules has been met, receiving input data to which the rules apply, executing the one or more rules against the input data to determine if a condition of the rules has been met, generating an action when a condition of the rules has been met by the input data, outputting a response to the user through a user interface depending on the action.

Embodiments in the present description are directed to a system for management of workflow data such as wasteful processes or process steps, risks, and suggested opportunities for improvement, the system comprising, an engine, wherein the engine centralized system for management of data capable of directly loading input data into the engine for a user to receive a response by the engine, a rules collection database having one or more rules, wherein the rules are a string of conditions to test input data against, the rules collection database configured to be in communication with the engine, input data, the input data configured to be applied against one or more rules whereby the engine is configured to execute the one or more rules against the input data to determine if a condition of the rules has been met then generate action when a condition of the rules has been met by the input data, a user interface accessible to one or more users, the user interface configured to output a response to one or more users through a user interface depending on the action generated by the engine.

BRIEF DESCRIPTION OF DRAWINGS

The present invention will be described by way of exemplary embodiments, but not limitations, illustrated in the accompanying drawings in which like references denote similar elements, and in which:

FIG. 3 depicts a sample of a data dictionary element.

FIG. 4 depicts a sample set of rules.

DETAILED DESCRIPTION

Figure 1:
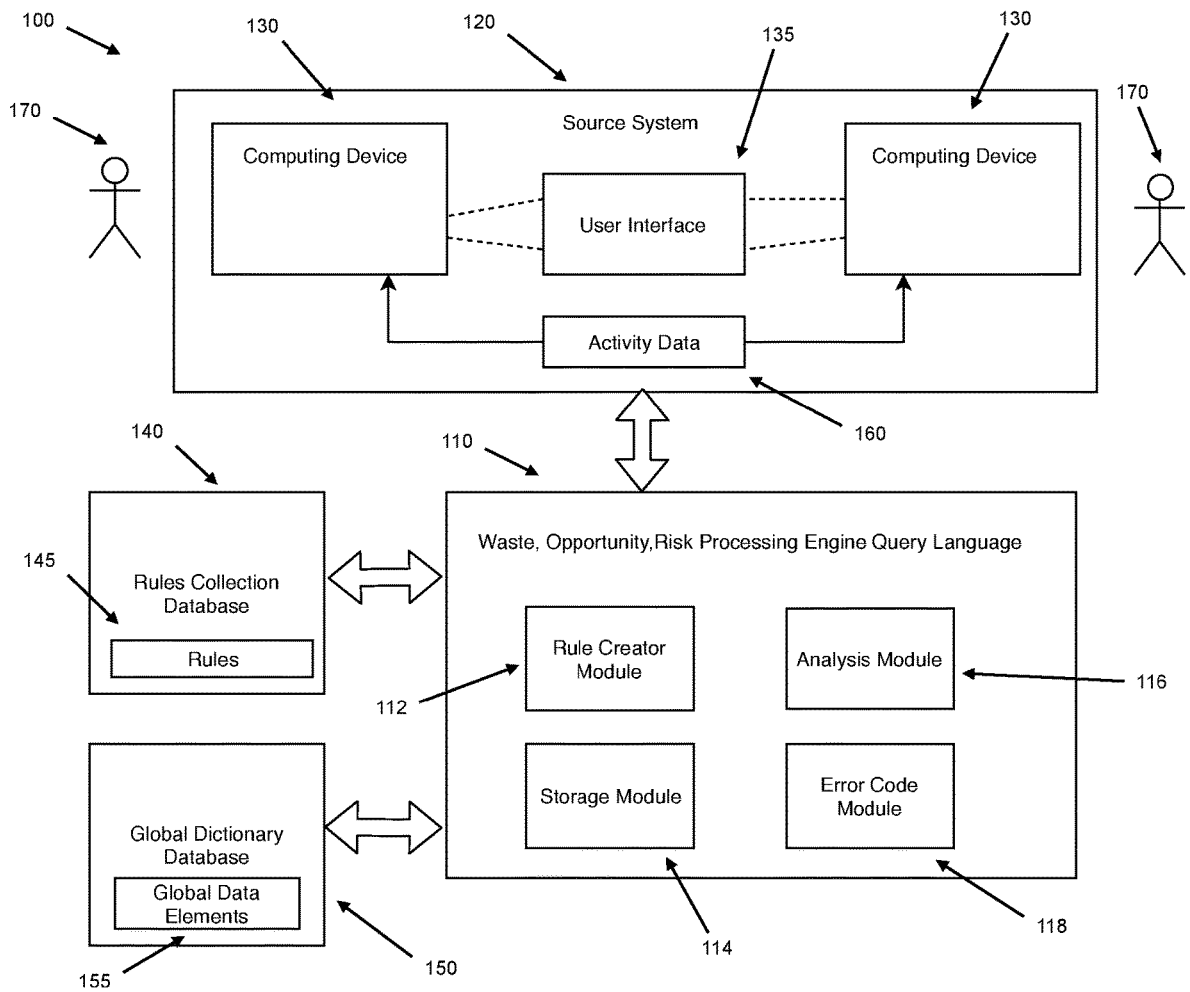
FIG. 1 depicts a schematic diagram of an embodiment of a system utilizing the Waste, Opportunity, Risk Engine Query Language.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature may also be used, to the extent possible, in combination with and/or in the context of other particular aspects and embodiments of the invention, and in the invention generally.

Where reference is made herein to a method comprising two or more defined steps, the defined steps may be carried out in any order or simultaneously (except where the context excludes that possibility), and the method may include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any item, so a "set of items," may indicate the presence of only one item, or may indicate more items. Thus, the term "set" may be equivalent to "one or more" as used herein.

The present disclosure recognizes the unsolved need for an efficient inference engine titled the Waste, Opportunity, and Risk Engine Query Language or (WORE-QL) that may link highly readable, declarative, semantically rich rules to any business objects in a workplace source system. The rules are constructed from small building blocks of business logic (small rule sets) that operate on information contained in various objects. This WORE-QL promotes cultural and engineer principles and values for teams to more quickly delivery high quality while generating textual analyses and recommendations for changes associated with the project or roll up of projects with approximate cost, time, resource, and application-based savings. WORE-QL provides capabilities to manage tasks (opportunities for improvement) and risk management.

FIG. 1 illustrates one embodiment of system 100 that includes a Waste, Opportunity, Risk processing engine query language (WORE-QL) such as WORE-QL 110, and in accordance with an illustrative embodiment of the present invention, will now be described. WORE-QL 110 may have a rule creator module such as rule creator module 112, a storage module such as storage module 114, an analysis module such as analysis module 116, and an error code module such as error code module 118. In various embodiments WORE-QL 110 provides a centralized system for management of workflow data such as wasteful processes or process steps, risks, and suggested opportunities for improvement that may be applied against a collection of rules whereby an output calculated from the comparison of the workflow data to the collection of rules may be displayed to one or more users.

System 100 may also include a rules collection database such as rules collection database 140, a global dictionary database such as global dictionary 150. WORE-QL 110 may receive activity such as activity data 160. Activity data 160 may be input data such as files, records, documents, numbers from source systems such as source system 120 whereby source system 120 may generate and output activity data 160 when activity data 160 is created by, uploaded to, modified by, transmitted to, transferred to, broadcasted to, streamed to, downloaded to, or otherwise encountered by, source system 120. Source system 120 may include any number of computing devices such as computing devices 130. Computing devices 130 may be the form of a computer. A computer may include any electronic device that is capable of executing an instruction. Components of the computer may include a processing unit, a system memory, and a system bus that couples various system components including the system memory to the processing unit. However, this is non-limiting and computing devices 130 may be a computing device such as a mobile computing device such as an iPhone®, Android®-based phone, or Windows®-based phone, tablet, video game console, wearable device, or smart home device, which are able to connect to WORE-QL 110. WORE-QL 110 may also be implemented into source system 120. Users such as users 170 may utilize source system 120 and may be in communication with WORE-QL 110 by any known method used by those skilled in the art, for example, via a network such as a local area network (LAN), wide area network (WAN), wireless network, the Internet, etc. Users 170 may be notified of various workflow data including activity data 160 that are evaluated and analyzed by WORE-QL 110.

System 100 may include a user interface such as user interface 135 that may be used by users 170 on source system 120 or another interconnected system, physically or remotely, to utilize WORE-QL 110 and where users 170 may view output of WORE-QL 110. User interface 135 may include a web-based user interface or a desktop-based user interface. User interface 135 may also include an email user interface to enable the users to interface with an application such as Microsoft Outlook. Any component known by those of ordinary skill in the art be may be added to user interface 135 to efficiently interface with WORE-QL 110. In one or more non-limiting embodiments, user interface 135 may be implemented on one or more connected computing devices 130 programmed to display outputted results. The module and databases may be embodied as software code to be executed by a processor. The software code for the modules and databases may be stored in a computer readable medium.

In one or more non-limiting embodiments, WORE-QL 100 may be implemented into a .NET Framework. However this is non-limiting and may be implemented into other types of language that are capable of supporting data structures or objects, collections, and robust string processing. The .NET Framework may provide language interoperability for several languages, for example versions of C, Java, and Visual Basic, by providing a virtual machine environment. A Common Language Infrastructure (CLI) may translate code in different languages to a Common Intermediate Language (CIL). The CLI is implemented using a Common Type System (CTS) and a Common Language Runtime (CLR). The CLR provides a virtual machine environment to relieve application developers from programming to a specific central processing unit (CPU) and handles system tasks such as memory management and garbage collection. The CTS has a specification which defines all data types and programming constructs supported by the CLR and the mechanisms for their interaction. The CTS allows the. NET Framework to support the exchange of types and object instances between libraries and applications written using any conforming. NET language.

WORE-QL 110 may be in communication with the rules collection database 140. Rules collection database 140 may contain data relating to rules such as rules 145, wherein rules 145 may be embodied by any suitable means wherein rules 145 may perform functions against activity data 160. Rules 145, in one or more non-limiting embodiments, may be a rule indicating a risk, waste, or opportunity for improvement, or any combination. Rules collection database 140 may also be stored in a text file. Each rule 145 in the collection may consist of an expression and text to display if the expression is true. The text may have imbedded information extracted from activity data 160 or another data source, to allow customization of the text appearance that users 170 see in user interface 135.

A set of rules 145 may be loaded into the rules collection database 140 from a JavaScript Objection Notation (JSON) array or to a collection of rule objects. In addition, a developer may create a set of named rules 145; whereby a developer may upload said set into rules collection database 145. In other non-limiting embodiments, users 170 may upload a set of rules 145 into rules collection database 140 through user interface 135 or by any other means known by those of ordinary skill in the art. For example a non-limiting example of the syntax for this method may be:

Boolean LoadRuleSet(JSON String|Name|Collection, AppendRules=false)

wherein if the first parameter is a string, the method checks to see if the first parameter is a JSON collection or a simple string. If the value is not JSON or is a Name that is not found, the function returns FALSE and the error code set. If the first parameter is a collection, then the collection is added to the rules property. Append Rules function allows WORE-QL 110 to either clear the rules first (FALSE) or to add the rules to the existing rules collection database (TRUE).

Rules 145 may be comprised of one or more expressions wherein the expression is a string of conditions to test data against, a text value wherein the text value may be HTML based wherein the text value describes a risk, waste, opportunity of cost associated with the expression that may be displayed if the expression is true, and a risk category wherein the risk category is a numeric code indicating the type of risk. For example the risk category may be designated as 0=N/A, 1=Communication, 2=Consistency, 3=Model, 4=Quality, 5=Stability, 6=Throughput, 7=Security.

The text value may have imbedded information extracted from activity data 160 or other data source, to allow customization of the text appearance specifically curtailed to users. Other optional fields may be added for a particular rule 145 such as level of suggestion, enumerated list of risk severity, and an enumerated list of waste associated with said rule 145.

The conditions of rules 145 may be comprised of an incorporated data element, a Boolean connector comprising one or more clauses, and value to compare with. The Boolean expression may be in Disjunctive Normal Form. The clauses in the Boolean expression may comprise logical clauses that allow fields to be compared to other fields or user defined values and may be characterized, for example, as a text comparison, a data comparison, or a numeric comparison. In one or more non-limiting embodiments, junctors are limited to {AND, OR} and are required for each Boolean expression with multiple clauses. The Boolean expression clauses may be characterized by: a clause type (e.g., logical); a clause junctor (e.g., AND, OR); a comparison type (e.g., a number, a date, a letter) that designates what is being compared; a left operand type that is located on the left side of a logical operator and that may be a field or a custom value; the logical operator (e.g., such as ="equals," # "does not equal," > greater than," < "less than," % "contains," ~ "does not contain," [a,b,c] "in list of a, b, c,"); and a right operand type that is located on the right side of the logical operator and that may be a field or a custom value.

The rules may also be as complex as desired by combining conditional tests with the Boolean operators AND (&&) or OR (||). The general syntax is Conditional test && Conditional test||Conditional test. The expression may be typically processed from left to right but operators may be combined using the { } group syntax. For example a non-limiting example of the syntax may be: Conditional test && {Conditional test||Conditional test} wherein the first conditional test is computed and saved. The next two tests are then computed. If either test is true, the overall result is true. The result then would be combined with the first conditional test using the && operator.

WORE-QL 110 may be in communication with global dictionary database 150. Global dictionary database 150 is a dictionary of global data elements such as global data elements 155 entries having one or more pairs of two strings, a key and a value whereby the entry may be comprised of multiple pairs. They key name may be defaulted to any valid string up to 128 characters but is not limited to this amount of characters. The value may be stored as a string but may also be a different data type. If the data type is not supported, then a null value may be returned, and any expression compared with it will be False. In one or more non-limiting embodiments, the key name determines the data type. For example, the name "DT" assumes the value is a date, the name "#" assumes a numeric value, and the name "YN" assumes a yes or no value. System 100 may be comprised of a single global dictionary database 150, however, other global dictionary databases may be added to system 100.

WORE-QL 110 may analyze and process activity data 160 from source system 120 using analysis module 116 or WORE-QL 110 may be uploaded into source system 120 to process activity data 160. Activity data 160 is a collection of one or more objects that WORE-QL 110 may check rules 145 against one or more of the objects. Activity data 160 may be made of any type of object wherein system 100 may match the properties within the object collection. This may allow for creating a unique set of rules for gathered data.

WORE-QL 110 may have a rules creator module 112 to receive and store information into a class of data. A new rule 145 may be created and added to a rules collection database 140 by using a wrapper method. WORE-QL 110 may return a Boolean True if a rule 145 was added or a False if the rule 145 was not added. User interface 135 may display an error property code from error code module 118 to indicate the rule 145 was not added to rule collection database 140. For example, an invalid missing required rule element may be displayed through user interface 135. WORE-QL 100 may also have a function wherein the function analyzes a rule 145, and if rule 145 is appropriate, add it to rule collection database 140. A developer may also directly manipulate rules collection database 140 using standard language constructs to clear rules, remove rules, or add rules 145.

Once analysis by analysis module 116 of WORE-QL 110 is complete, evaluation and conclusion information may be stored in storage module 114 of WORE-QL 110 to which all conclusions and their related data are stored and maintained. If one or more conditions are evaluated, and if it evaluates to true, WORE-QL 110 may initiate one or more actions. The action may be a displayed text through user interface 135 to users 170 or, in one or more non-limiting embodiments, categorization in the form of graphs or tables through user interface 135 to users 170. WORE-QL 110 may also publish actions to other applications as needed for consumption by the other applications such as Microsoft Excel® or Microsoft Office®. WORE-QL 110 may provide alerts about actions whereby the actions may be communicated in, for example, email format, instant messages to user's 170 desktop, and/or a format suitable for a mobile computing device. Actions may have additional information for example, such as security and account information, to enhance the representation of the action to the specific user such as transforming the information into a more meaningful form to the user. Rules collection database 140 may be categorized by levels of priority to be specified for various actions. Examples of priority levels may be "low priority" "medium priority" and "high priority."

WORE-QL 110 may determine which action should be routed to a specific group of users 170 based on routing indicators in the rules collection database 140. For example, a rule 145 may have an indicator of type A whereby the action may directed to a group of users 170 corresponding to type A.

Figure 2:
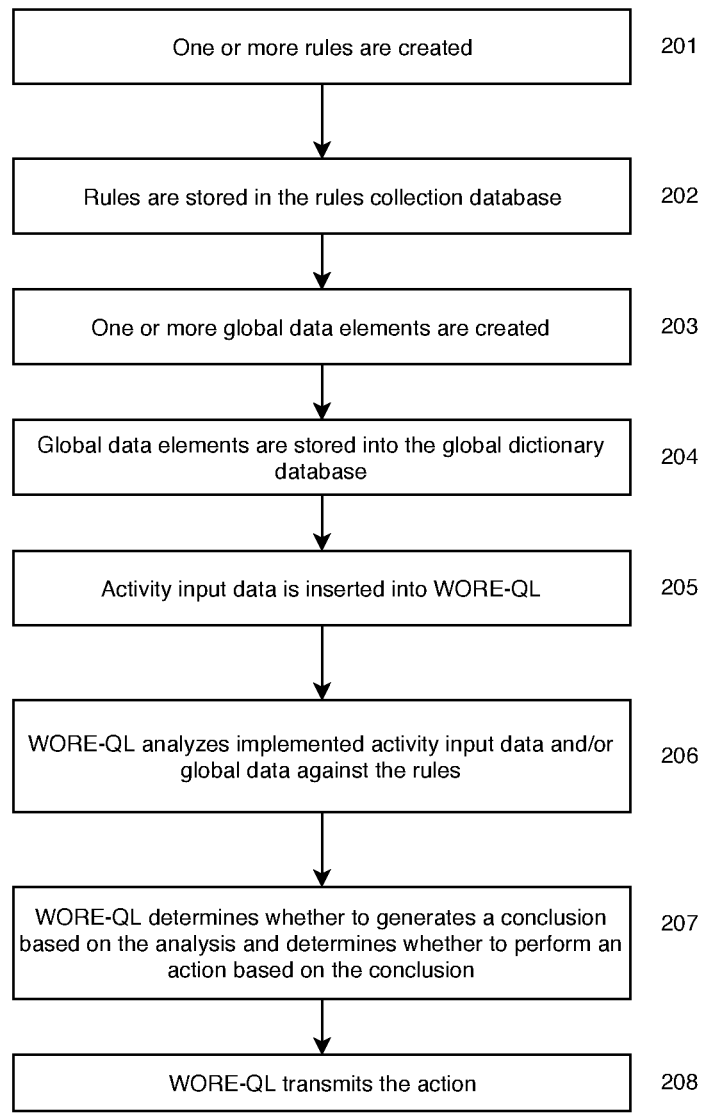
FIG. 2 depicts a flowchart for operating a system utilizing the Waste, Opportunity, Risk Engine Query Language.

FIG. 2 illustrates a method of system whereby WORE-QL 110 provides a centralized system for management of workflow data such as wasteful processes or process steps, risks, and suggested opportunities for improvement that may be applied against a collection of rules whereby an output calculated from the comparison of the workflow data to the collection of rules may be displayed to users. At step 201, one or more rules 145 are created wherein rules 145 comprise one or more tests for evaluating data elements. The data element as the item to be tested under rules 145 in one or more non-limiting embodiments may be a value from the global dictionary database 150 or activity data 160, however the data element is not limited to be acquired by these sources and in one or more non-limiting embodiments, data elements may be from three or more sources and may all be tested at once.

At step 202, rules 145 are stored in rules collection database 140. At step 203, one or more global data elements 155 comprised of one or more keys and values are created. At step 204, global data elements 155 are stored into the global dictionary database 150. At step 205, activity data 160 is implemented into WORE-QL 110 from source system 120, activity data 160 having one or more activity data elements. At step 206, WORE-QL analyzes an element from activity data 160 or a global data element 155, whereby global data element 155 is analyzed or an elements of activity data 160 are evaluated against global data element 155 using one or more conditions of the rules 145. At step 207, WORE-QL 110 determines whether to generate a conclusion based on the evaluation or analysis, each conclusion indicating if a criteria has been met and determining whether to perform an action based on the conclusion. At step 207, WORE-QL 110 transmits the action; typically, in the form of waste, opportunity, or risk, as well as findings where the action may be displayed to user 170 through user interface 135 if there is chance for finding possible improvement in the process.

WORE-QL 110 may support functions that operate against the entire activities list from activity data 160. Some of the functions supported may be COUNT(field:value) wherein the function returns the number of occurrences of fields with an indicated value, SUM(field:value, numeric field) wherein the function returns the sum of the total value of the indicated fields for numeric fields, PERCENT(field: value,numeric) wherein the function returns number of times a field occurs over number of items in the collection, and SEQ(field:value) wherein the function returns the sequence number of the first occurrence of value. In these functions, the syntax of field: value indicates the field name and the value to test the field for.

In one or more non-limiting embodiments, the value may be an asterisk wherein any value in the field will be accepted. In one or more non-limiting embodiments, the field may contain the percent sign wherein it will be treated as wildcard lookup in the value. Functions such as these allow for decisions to be made about the entire collection. For example, if the collection contains activities of activity data 160 in a testing phase, and has properties called "role" and "action," the following functions may be used: COUNT (Role:DEV) wherein the function returns the number of developers involved, SUM(Typical:*) wherein the sum of the typical time spent among all activities is returned, PERCENT(Action:TEST) wherein the function returns the percent of testing activities over all activities in the collection, SEQ(Action:CHECKOUT) wherein the function returns the sequence of when the checkout activity takes place. In one or more non-limiting embodiments, the Percent and Sum functions take an optional second parameter of a numerical field to be used to compute percent or sum rather than based on counts. For example, a non-limiting example of the syntax for this function may be: PERCENT(field: value,numericField). Activity functions may be used on either side of the expression, so a function such as SEQ (Action:Checkout)>SEQ(Action:Build) may indicate that one activity (Checkout) was performed after another activity (Build). Combining global dictionary database 150 and activities data 160 processing may help users 170 view a complete analysis on a business process, technical process, or series of processes.

When WORE-QL 110 is evaluating data elements, WORE-QL 110 may be designed to first search for the data element in the current activity of activity data 160 and then in global dictionary database 150. Global dictionary database 150 may be searched first by prefixing a term such as "gb" in front of the field name. A rule 145 also may be set so that it only searches the global dictionary database 150. The value may also be from the current activity in activity data 160 in the process being reviewed. For example, if the activity data 160 indicates how long an activity typically takes place at their company and industry standard time is a value in the global dictionary database, the test:

"TypicalTime>CA:IndustryStandardTime" may be used as an expression to analyze if the value is longer than suggested industry standards. A text value may appear through user interface reporting if activity time is greater than the industry standard. In this test, CA is the example industry standard time, but businesses may have their own specifications for this value that may be inserted.

FIG. 3 shows a sample of a data dictionary where a set of rules 145 are evaluated to the properties of a .NET project file. Global dictionary database 150 may be referenced in a rule 145 by using the syntax gb. [Key] wherein [Key] is the desired data element to have rule 145 added. Using this, the following shows an example of the system, applied to the simple data dictionary wherein there are two rules 145 being evaluated as shown in FIG. 4. The first rule 145 that would report if the debug flag is still on to remind a developer to turn it off before a production release. The second rule 145 would serve as a reminder to make sure the copyright notice contains the current year:

WORE-QL.WORE-QL TestWORE-QL=new WORE-QL.WORE-QL( );
WORE-QL.Rule TestRule1=new Rule ("gb.DebuYN=true," "Turn off debugging for production");
WORE-QL.Rule TestRule2=new Rule (gb.Copyright~@AYear, "Update copyright date");
TestWORE-QL.GlobalInfo.Add("DebugYN," "1");
TestWORE-QL.GlobalInfo.Add("Copyright," "Copyright @Clearly Agile 2017");
TestWORE-QL.GlobalInfo.Add("OutputType," "Class");
TestWORE-QL.Rules.Add(TestRule1);
TestWORE-QL.Rules.Add(TestRule2);
SortedList<string, string> ans=TestWORE-QL.SimpleEval( );

In one or more non-limiting embodiments, the same data element may then be displayed again in the text value that may appear if an expression is true. In one or more non-limiting embodiments, this may be done by enclosing the data element with characters such as "{ }". For example, if you want to risk that testing should be at least 40% of time spent in a particular list of activities an expression for this may be:

PERCENT(action:TEST,typical)<gb.TestPercent).

The displayed text to incorporate these data elements may be: "You are only spending {PERCENT(action:TEST,typical),P1} of your time doing testing activities. We recommend at least {gb.TestPercent,P1} of the activities in a quality assurance phase be spent on testing work."

A second parameter may also be specified which may be the formatting parameter of the variable. Formatting parameters that may be used but are not limited to Fx for fixed with x decimal places, Cx for currency with x decimal places, Px for percent with x decimal places, SD for Short date, YYYY for Four-digit year, YY for two-digit year, MM for Numeric month number, and MMM for 3-Character month abbreviation.

In accordance with one or more non-limiting embodiments of the invention, WORE-QL 110 may have an error-checking module 118 wherein whenever an error in the system is detected, an error code property is set to an error code and the function returns an empty occurrence of its return value whereby the error code may be visible to user 170 through user interface 135. For example, if there are no rules found while running a Simple Eval function method, the error code may be set to a specific number and an empty collection would be returned. Same error codes for the system may include: Code 100 for no rules being defined, Code 101 for no data found, Code 200 for Invalid rules found, Code 201 for rules reference non-existent data elements, Code 202 for missing required rule element, Rule 300 for invalid credentials, and Rule 301 for expired credentials.

In one or more non-limiting embodiments, WORE-QL 110 may utilize a Parse Rule Set method of checking data wherein WORE-QL 110 reads through each element in rules 145 and returns a list of the expressions, an error code, and a short message indicating an error code if rule 145 is improperly entered to user interface. For example a non-limiting example of the syntax for this method may be: Collection<Rule result>=ParseRuleSet( ). This method may allow a developer to check their rules 145 prior to applying activity data 160. In the scenario where the Parse Rule Set is called before the activity data 160 is loaded, rules 145 are only checked for syntax. If the activity data 160 or global data elements 155 are loaded, rules 145 are both syntax checked and field names are checked for validity in both global dictionary database 150 and activities of activity data 160.

Method functions that may be utilized in the WORE-QL 110 will now be further described, WORE-QL 110 may have a "Simple Eval( )" method function wherein the method allows a set of rules to be checked against global dictionary database 150. This function also allows the WORE-QL 110 to parse a simple keyed pair collection and report any issues found. For example a non-limiting example of the syntax for this method may be:

"Collection<RuleObjects>=SimpleEval( )".

Using this method function, each rule in the rules collection database 140 will be compared against activity data 160 or global data elements 155. If the expression returns TRUE, the rule is added to the result collection. When all rules 145 are checked, the matches are returned by this method. If any rules 145 are invalid, the returned collection is empty and the error code is set. A developer may then use the parse rule set method to determine the exact errors.

In one or more non-limiting embodiments, WORE-QL 110 may have an Eval Activities method function wherein the method allows a set of rules 145 to be checked against a collection of objects, including activity data 160 or global data elements 155, defined by a developer or another person. If the rules 145 are valid, a list of all the rules 145, which are matched, will be returned. For example a non-limiting example of the syntax for this method may be:

Collection<RuleObjects>=EvalActivities( )

wherein WORE-QL 110 may evaluate the existing activities collection of activity data 160 and return the matching expressions or:

Collection<RuleObjects>=SimpleEval(List<object>)

wherein the WORE-QL 110 adds an activity list of activity data 160, thus overwriting the existing activities of activity 160 and returning matching expressions.

To further detail the process of these methods, the steps would be: the WORE-QL 110 would determine the optimal path, either iterate rules checking all activities, or iterate activities checking all rules. For each rule, the WORE-QL 110 compares the expression against the current data object and global dictionary database. If a match is found, the rule is added to the result. If a match is not found, nothing is done. The results are then returned when the method is complete. If any errors are found, the rules collection database will return empty and the error code is set. A developer may check the exact errors using Parse Rule Set.

The steps that are performed when evaluating expressions are emptying out the Boolean truth collection; breaking the expression into a collection of individual expressions and Booleans; processing each individual expression and creating a True or False result, adding the resulting Boolean value to the truth collection; and once all expressions are evaluated, combining them with the Boolean operators to return a final True/False value. For example if the expression is: gb.Environment=Net && Activity=Checkout && Manual=Yes" WORE-QL 110 would break this into three individual rules and evaluate each one. If gb.Environment=NET is True and Activity=CHECKOUT is True and Manual is True, the entire expression is TRUE and the rule is returned.

The following are non-limiting examples of some of the findings for improvement WORE-QL 110 may discover from analysis of an object and output through user interface 135 to a user. If the object does not have checkout activity, WORE-QL 110 may output a to do task such as "add a checkout activity prior to compiling/testing" with additional details including "all code/scripts should be in a version control system, such as GIT or Subversion, even in a small shop. If you use version control, require all developers to check code in and out. If you don't use version control, we strongly recommend using it for any size development effort." An auto resolve message may be shown such as "added checkout activity" when checkout activity is added to the object.

If the object does not have deploy process, WORE-QL 110 may output a to do task such as "add deployment activities" with additional details including "at least one (1) deployment activity is expected for a {Solution_Type} to be released into production. Accurately describing these types of activities is required to attain insights of risks and opportunities for improvement." An auto resolve message may be shown such as "added deployment activity" when deployment activity is added to the object.

If the object does not have testing steps, WORE-QL 110 may output a to do task such as "add functional and non-functional testing activities" with additional details including "a {Solution_Type} needs to have sufficient testing for validation and verification to reduce time, cost, and risk in its deployment and maintenance. Validating the {Solution_Type} behaves as expected by users/consumers early in the lifecycle eliminates/reduces functional defects found during follow-on testing and production. Verifying the {Solution_Type} aligns to internal non-functional requirements early in the lifecycle eliminates/reduces preventable defects thus reducing time, cost, and risk in its deployment and maintenance. Advise testing activities for validation and testing activities for verification." An auto resolve message may be shown such as "added testing steps" when testing steps is added to the object.

If no code reviews have been performed, WORE-QL 110 may output a to do task such as "add code review activity prior to the activity to push changes to the repository" with additional details such as "a code review prior to pushing changes to the repository, while manual, is an effective technique to identify possible functional and non-functional errors and omissions to include alignment to coding standards. Identifying and addressing findings before integration leads to reduced waste (time, cost, etc.) and risk. Suggest a discretional code review activity just prior to the activity of pushing changes to the repository." An auto resolve message may be shown such as "added code review" when code review is added."

If no unit testing has been performed, WORE-QL 110 may output a to do task such as "add unit testing activity prior to code integration" with additional details such as "unit testing should be required for {Solution_Type} as the developer will have an automated way to identify method-level bugs caused by new or refactored code. Ideally, unit test will automatically trigger during compilation and prevent the start of the build process even on a single failure. Teams should also collaborate with stakeholders to determine the minimal unit test code coverage." An auto resolve message may be shown such as "added unit testing" when unit testing is added."

If smoke testing has not been performed, WORE-QL 110 may output a to do task such as "add functional testing activities as part of the integration testing phase" with additional details such as "smoke test for {Solution_Type} are an ideal way to quickly identify if its available and appears to functionally work. Minimally, smoke test activities should occur after a build occurs but more ideally the team will establish automated smoke tests as the {Solution_Type} is pushed to each environment." An auto resolve message may be shown such as "added smoke testing" when smoke testing is added."

If static testing hasn't been performed, WORE-QL 110 may output a to do task such as "add static code analysis activities as part of the build or integration testing phase" with additional details such as "{Solution_Type} solutions should include static code analysis activities to identify and address potential problems as early as possible in the {Solution_Type} lifecycle. Manual tools in the during development, like SonarLint or ReSharper provides the software engineer the ability to immediately address issues as they are detected. Integration a service like SonarQube, in the build phase, is an ideal way to create a list of more comprehensive findings across multiple languages simultaneously within a product." An auto resolve message may be shown such as "added static testing" when static testing is added."

If there is no continuous integration phase in the object, WORE-QL 110 may output a to do task such as "implement continuous integration" with additional details such as "implementation of Continuous Integration (CI) creates a consistent approach for new or refactored code to be added to the repository, compiled, and built. This consistent approach automatically identifies defects and code quality issues so early in the lifecycle that it allows developers to resolve them before follow-on integration and testing activities are conducted. The investment in CI will reduce the overall time, cost, and risks in the delivery and maintenance of a {Solution_Type}." An auto resolve message may be shown such as "added at least one (1) continuous integration activity" when continuous integration activity is added."

If there is no continuous integration phase in the object, WORE-QL 110 may output a to do task such as "UAT phase in the model" with additional details such as "move user testing activities as close to the initial integration testing phase as possible and eliminate the {Phase} phase" with additional details such as "the most efficient approach to attain user feedback is to include them in ideation and planning events and then test as soon as the newly created or refactored functionality has been integrated into a test environment. Allowing users an opportunity to provide input on what they expect and how they will test their expectations during ideation and planning eliminates/reduces unnecessary scope and level sets the minimal behavior to be tested. Having users test the behavior of the {Solution_Type} as close to development activities as possible provides faster feedback and as-needed adjustments. Typically, UAT environments are too far removed from he current baseline of code, scripts, data, etc. to be relevant/trusted and thus wasting time and money with testing and feedback activities." An auto resolve message may be shown such as "added at least one (1) Continuous Integration activity" when at least one (1) Continuous Integration activity is added."

The following are non-limiting examples of some of the risks and opportunities for improvement WORE-QL 110 may discover from analysis of an object and output through user interface 135 to a user. WORE-QL 110 may determine if a model cannot be properly evaluated because the <b>Compile</b> activity is missing. If compiling is not in the model, WORE-QL 110 may output the risk through the user interface 135 "the model cannot be properly analyzed to help your organization." WORE-QL 110 may also output opportunities for improvement through user interface 135 such as "introduce the compiling activity in the pre-commitance phase to test locally, in the Continuous Integration phase to ensure testing against the entire current baseline, and the build phase to ensure consistency with solution compilation and building agreements," "introduce the compiling activity in the Continuous Integration phase to ensure testing against the entire current baseline and the build phase to ensure consistency with solution compilation and building agreements," and "introduce the compiling activity into the build process phase."

WORE-QL 110 may determine if a model cannot be properly evaluated because the <b>Build</b> activity is missing. If build activity is not in the model, WORE-QL 110 may output the risk through the user interface 135 "the model cannot be properly analyzed to help your organization." WORE-QL 110 may also output opportunities for improvement through user interface 135 such as "introduce the building activity in the Continuous Integration phase to ensure testing against the entire current baseline and the build phase to ensure consistency with solution compilation and building agreements," and "introduce the building activity into the build phase."

WORE-QL 110 may determine if a model cannot be properly evaluated because the <b>Deploy</b> activity is missing. If deploy activity is not in the model, WORE-QL 110 may output the risk through the user interface 135 "the model cannot be properly analyzed to help your organization." WORE-QL 110 may also output opportunities for improvement through user interface 135 such as "introduce deployment activities into the model."

WORE-QL 110 may determine if a model cannot be properly evaluated because the <b>Delivery</b> activity is missing. If delivery activity is not in the model WORE-QL 110 may output the risk through the user interface 135 "the model cannot be properly analyzed to help your organization." WORE-QL 110 may also output opportunities for improvement through user interface 135 such as "introduce delivery activities into the model."

WORE-QL 110 may determine if there are no testing in the model results, which may result in low quality products with unnecessary defects, efforts, and costs to remediate later. If there is no testing in the model WORE-QL 110 may output the risk through the user interface 135 "code will be merged to the baseline without a minimal level of acceptable testing thus resulting in lower quality products." WORE-QL 110 may also output opportunities for improvement through user interface 135 such as "fully automate minimal testing across all necessary phases and activities that provides fast and usable feedback to the developers," and "conduct minimal testing across all necessary phases and activities that provides fast and usable feedback to the developers."

WORE-QL 110 may determine if there is lack of reviews, thus allowing flaws and sub-optimizations to be introduced. If there are no reviews WORE-QL 110 may output the risk through the user interface 135 "flaws and sub-optimizations that would be detected with this activity get implemented." WORE-QL 110 may also output opportunities for improvement through user interface 135 such as "utilize automated smoke testing and a nearly automated checkout processes to get confidence that what was released works as expected," "implement smoke tests and some level of review/checkout to ensure what was released meets customers expectation," and "implement some level of review/checkout to ensure what was released meets customers expectation."

WORE-QL 110 may determine is there is a lack of code review allowing flaws and sub-optimizations into higher level environments causing unnecessary remediation efforts and costs. If code reviews do not occur WORE-QL 110 may output the risk through the user interface 135 "flaws and sub-optimizations will be leaked to higher environments translating into greater efforts and cost to remediate the issues." WORE-QL 110 may also output opportunities for improvement through user interface 135 such as "utilize an IDE friendly tool to help automate code/peer review activities," and "create team agreement to conduct code/peer reviews before merging code to the baseline."

WORE-QL 110 may determine if there is no integration testing in the model resulting in low quality products with unnecessary defects, efforts, and costs to remediate them later. If there are no integration tests in the model WORE-QL 110 may output the risk through the user interface 135 "code will be merged to the baseline without a minimal level of acceptable testing at the method level thus resulting in lower quality products." WORE-QL 110 may also output opportunities for improvement through user interface 135 such as "fully automate integration testing in order to prevent check-in, compilation, or building of solutions with integration testing bugs," "fully automate integration tests in order to prevent check-in and compilation of solutions with integration test bugs," and "fully automate integration tests in order to prevent check-in of solutions with integration test bugs."

WORE-QL 110 may determine if there is no functional testing in the model resulting in low quality products with unnecessary functional defects as well as the efforts and costs to remediate them later. If there are no functional tests in the model WORE-QL 110 may output the risk through the user interface 135 "code will be merged to the baseline without a minimal level of acceptable testing at the method level thus resulting in lower quality products." WORE-QL 110 may also output opportunities for improvement through user interface 135 such as "fully automate functional testing in order to prevent check-in, compilation, or building of solutions with functional testing bugs, "fully automate functional tests in order to prevent check-in and compilation of solutions with functional test bugs," and "fully automate functional tests in order to prevent check-in of solutions with functional test bugs."

WORE-QL 110 may determine if there is no accessibility testing in a web application resulting in low quality products with unnecessary user accessibility defects as well as the efforts and costs to remediate them later. If there are no accessibility tests in the model WORE-QL 110 may output the risk through the user interface 135 "code will be merged to the baseline without a minimal level of acceptable testing at the method level thus resulting in lower quality products." WORE-QL 110 may also output opportunities for improvement through user interface 135 such as "fully automate accessibility testing in order to prevent check-in, compilation, or building of solutions with accessibility testing bugs," "fully automate accessibility tests in order to prevent check-in and compilation of solutions with accessibility test bugs," and "fully automate accessibility tests in order to prevent check-in of solutions with accessibility test bugs."

WORE-QL 110 may determine if there are no smoke tests in the model resulting in low quality products with unnecessary sub-system/integration/functional defects as well as the efforts and costs to remediate them later. If there is no smoke testing in the model WORE-QL 110 may output the risk through the user interface 135 "code will be merged to the baseline without a minimal level of acceptable testing at the method level thus resulting in lower quality products." WORE-QL 110 may also output opportunities for improvement through user interface 135 such as "fully automate smoke testing after delivery and deployment activities in order to identify bugs that leaked through the other types of testing," and "Conduct smoke tests after delivery and deployment activities in order to identify bugs that leaked through the other types of testing."

WORE-QL 110 may determine if there is no static testing in the model resulting in low quality products with unnecessary vulnerabilities and weaknesses as well as the efforts and costs to remediate them later. If there are static testing activities in the model WORE-QL 110 may output the risk through the user interface 135 "code will be merged to the baseline without a minimal level of acceptable testing at the method level thus resulting in lower quality products." WORE-QL 110 may also output opportunities for improvement through user interface 135 such as "fully automate static testing into Continuous Integration and build process and break the builds for major vulnerabilities," "fully automate static testing into Continuous Integration and build process," and "execute static tests manually and disallow promotion to higher environment when major vulnerabilities are detected."

WORE-QL 110 may determine if there is no security testing in the model resulting in low quality products with unnecessary vulnerabilities/security issues as well as the efforts and costs to remediate them later. If there are no security tests in the model WORE-QL 110 may output the risk through the user interface 135 "code will be merged to the baseline without a minimal level of acceptable testing at the method level thus resulting in lower quality products." WORE-QL 110 may also output opportunities for improvement through user interface 135 such as "fully automate security testing into Continuous Integration and build process and break the builds for major vulnerabilities," "fully automate security testing into Continuous Integration and build process," and "require team to manually run security tests before consideration to mode latest version(s) to higher environments," and "fully automate a CI process and require each solution to utilize it."

In other non-limiting embodiments, the activity data 160 may be received into a web-based system, wherein the activity data 160 comprises structured information and may include, but is not limited to, traditional written documents, vector graphics, e-commerce transactions, algorithms, object meta-data, server APIs (application program interfaces), etc. Thus, activity data 160 may be any type of document into which data may be captured for later analysis in accordance with embodiments of the present invention. Preferably, activity data 160 is received in a predetermined format to enable efficient control of the document and to also enable any document to be received into the web based system regardless of who created the document, what business they are in, and manner in which they inserted the document.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the use contemplated. The scope of the invention is to be defined by the claims.

What is claimed is:

1. A method of outputting data analysis using an engine for management of workflow data for identification wasteful processes or process steps, risks, and suggested opportunities for improvement, the method comprising:
   providing the engine, wherein the engine is a centralized system for the management of the workflow data; capable of directly inputting the workflow data into the engine for a user to receive a response by the engine; wherein the engine processes different events originating from a population of computing devices, the population of the computing devices having a non-transitory computer-readable medium, wherein a network is connected to a source system comprising the population of the computing devices and the engine wherein the workflow data transmitted between the source system and the engine is translated into a format to support exchange of the workflow data between the source system and the engine, the engine configured to receive, from the source system, the workflow data associated with operations of the network;
   creating a rules collection database having one or more rules, wherein the one or more rules are a string of conditions to test the workflow data against, the rules collection database configured to be in communication with the engine; the workflow data configured to be applied against the one or more rules whereby the engine is configured to execute the one or more rules against the workflow data to determine if a condition of the string of the conditions has been met, then generate at least one action when the condition of the one or more rules has been met by the workflow data;
   obtaining a rule definition defining at least one object, the at least one action, and a rule of the one or more rules, wherein the at least one object identifies an input into the engine, wherein the input is defined in terms of at least one of the population of the computing devices of the source system, wherein the rule identifies at least one condition referencing at least one computing device of the population of the computing devices of the source system;
   receiving the workflow data to which the one or more rules apply;
   executing the one or more rules against the at least one object to determine if the at least one condition of the rule has been met to establish a conclusion;
   generating based on the at least one object and the conclusion, an action to be performed by the source system wherein the action is taken in response to the at least one object, the at least one condition associated with the one or more rules, the at least one object, and the at least one computing device of the population of the computing devices of the source system;
   providing, to the source system, the action wherein the action includes analysis for attaining insights of the risks, the wasteful processes, and the opportunities for improvement in the workflow data;
   outputting the response to the user through a user interface depending on the action; and
   displaying on the user interface accessible to the user the response depending on the action.

2. The method of claim 1, further comprising providing to the source system a second action for attaining the insights of the risks, the wasteful processes, and the opportunities for improvement in the workflow data in response to modification of the at least one object, wherein the modification of the at least one object produces a different conclusion.

3. The method of claim 1, further comprising adding a first rule of the one or more rules to the rules collection database, the engine having a rules creator module wherein the rules creator module permits addition of the first rule to the rules collection database and modification of existing rules.

4. The method of claim 1, further comprising creating a global dictionary database, the global dictionary database having global data elements comprised of one or more keys and values, whereby the global data elements are analyzed against the one or more rules or against the workflow data using the conditions of the one or more rules.

5. The method of claim 1, further comprising routing the response to a subset of the population of the computing devices, the subset having more than one computing device, the at least one action, wherein the subset of the population of the computing devices is determined based on routing indicators of the rule.

6. The method of claim 1, further comprising saving the at least one action for historical records to show different values over a timeline; and
   storing complete, evaluation, and conclusion information in a storage module.

7. The method of claim 1, further comprising displaying text, the text as the response outputted to the user through the user interface.

8. The method of claim 1, further comprising loading the one or more in the rules collection database from a JavaScript Objection Notation (JSON) array.

9. The method of claim 1, wherein the workflow data is a file, record, documents, or number.

10. The method of claim 1, further comprising categorizing rules by levels of priority, the levels specified for the at least one action comprising low priority, medium priority, and high priority.

11. The method of claim 1, further comprising outputting the response with additional information comprising security and account information, to enhance representation of the response to the subset of the population of the computing devices.

12. A system for management of workflow data for identification of wasteful processes or process steps, risks, and suggested opportunities for improvement, the system comprising:

an engine capable of directly inputting the workflow data into the engine for a user to receive a response by the engine; wherein the engine processes different events originating from a population of computing devices, the population of the computing devices having a non-transitory computer-readable medium, wherein a network is connected to a source system comprising the population of the computing devices and the engine wherein the workflow data transmitted between the source system and the engine is translated into a format to support exchange of the workflow data between the source system and the engine, the engine configured to receive, from the source system, the workflow data associated with operations of the network;

a rules collection database having one or more rules, wherein the one or more rules are a string of conditions to test the workflow data against, the rules collection database configured to be in communication with the engine, the workflow data configured to be applied against the one or more rules whereby the engine is configured to execute the one or more rules against the workflow data to determine if a condition of the one or more rules has been met, then generate at least one action when the condition of the one or more rules has been met by the workflow data; and a user interface accessible to the user, the user interface configured to output the response to the user through the user interface depending on the at least one action generated by the engine, wherein instructions are executed by the engine to perform:

obtaining a rule definition defining at least one object, the at least one action, and a rule of the one or more rules, wherein the at least one object identifies an input into the engine, wherein the input is defined in terms of at least one of the population of the computing devices of the source system, wherein the rule identifies at least one condition referencing at least one computing device of the population of the computing devices of the source system;

execute the one or more rules against the at least one object to determine if the at least one condition of the rule has been met to establish a conclusion;

determining, based on the at least one object and the conclusion, an action of the at least one action to be performed by the source system wherein the action is taken in response to the at least one object, the at least one condition of the rule, the at least one object, and the at least one computing device of the population of the computing devices of the source system;

providing, to the source system, the action wherein the action includes analysis for attaining insights of the risks, the wasteful processes, and the opportunities for improvement in the workflow data; and displaying on the user interface accessible to the user the response depending on the action.

13. The system of claim 12, wherein the instructions are executed by the engine to further perform: providing to the source system a second action for attaining insights of the risks, the wasteful processes, and the opportunities for improvement in the workflow data in response to modification of the at least one object, wherein the modification of the at least one object produces a different conclusion.

14. The system of claim 12, wherein the instructions are executed by the engine to further perform: adding a list of activities to the input; and overwrite existing activities of the input wherein the engine permits a set of rules to be checked against a collection of objects.

15. The system of claim 12, wherein the user interface is a web-based user interface, wherein the engine is a separate entity from the source system.

16. The system of claim 12, wherein the workflow data is a file, record, documents, or number, wherein the instructions are executed by the engine to further perform: storing complete, evaluation, and conclusion information in a storage module, directing to a subset of the population of the computing devices, the at least one action, wherein the subset of the population of the computing devices is determined based on routing indicators of the rule, wherein the at least one object are obtained from multiple computing devices of the population of the computing devices separately to be tested simultaneously for a single action to be performed.

17. The system of claim 12, wherein the instructions are executed by the engine to further perform: transforming the action in response to one of the computing devices of the population of the computing devices to enhance representation of one of the computing devices of the population of the computing devices, wherein the transforming of the action comprises implementing additional security and account information.

18. The system of claim 12, wherein the instructions are executed by the engine to further perform: analyzing, by one or more processors, inputted rules wherein for each inputted rule of the inputted rules, if a component of the each inputted rule fails to satisfy the at least one condition associated with the respective inputted rule the source system is configured to prevent the respective rule from evaluating the input, wherein a collection of rules is dynamically adjusted by the analysis of the inputted rules.

19. The system of claim 12, wherein the instructions are executed by the engine to further perform: matching properties of the at least one object within an object collection to create a unique set of rules for the at least one object, presenting rules prior to applying the rules to the object collection, the rules having numeric codes for indicating type; generating a topology of a group of actions by levels of priority specified for individual actions; categorizing the action in a form of graphs and tables; publishing the action to other applications as needed for consumption by one or more separate applications; transmit notifications of the action in a compatible format for a separate mobile computing device of the user.

20. The system of claim 12, wherein the instructions are executed by the engine to further perform: analyzing if a compile activity is missing, if a build activity is missing, if a deploy activity is missing, and if a delivery activity is missing;

analyzing if there are no smoke testing in the workflow data resulting in low quality products with unnecessary sub-system/integration/functional defects as well as efforts and costs to remediate them later, if there are no static testing in the workflow data resulting in the low quality products with unnecessary vulnerabilities and weaknesses as well as the efforts and the costs to remediate them later, if there is no security testing in the workflow data resulting in the low quality products with unnecessary vulnerabilities/security issues as well as the efforts and the costs to remediate them later, if there is no accessibility testing in a web application resulting in the low quality products with unnecessary user accessibility defects as well as the efforts and the costs to remediate them later, and if there is no functional testing in the workflow data resulting in the low quality products with unnecessary functional defects as well as the efforts and the costs to remediate them later; and analyzing if there is a lack of reviews allowing flaws and sub-optimizations to be introduced and determining if there is the lack of code review allowing the flaws and the sub-optimizations into higher level environments causing unnecessary remediation efforts and the costs.

* * * * *